United States Patent [19]

Stroud

[11] 4,445,701

[45] May 1, 1984

[54] VEHICLE STRUCTURE

[75] Inventor: Edward A. Stroud, Toronto, Canada

[73] Assignee: Stroudex Industries Inc., Brampton, Canada

[21] Appl. No.: 330,707

[22] Filed: Dec. 14, 1981

[51] Int. Cl.³ .............................................. B62M 1/10
[52] U.S. Cl. .................................... 280/217; 280/238; 280/258
[58] Field of Search .............. 280/217, 238, 215, 258; 180/165

[56] References Cited

U.S. PATENT DOCUMENTS

| 152,160 | 6/1874 | Nowak | 280/217 |
|---|---|---|---|
| 354,649 | 12/1886 | Mohr | 280/217 |
| 373,282 | 11/1887 | Frie | 280/217 |
| 1,329,940 | 2/1920 | Wallace | 280/214 |
| 1,784,419 | 12/1930 | Devito | 280/217 |
| 2,141,233 | 12/1938 | Alexander | 280/217 |
| 3,633,938 | 1/1972 | Solomon et al. | 280/255 |
| 3,759,543 | 9/1973 | Clark | 280/236 |
| 4,037,854 | 7/1977 | Large | 280/217 |
| 4,116,088 | 9/1978 | Giovachini et al. | 74/572 |
| 4,227,712 | 10/1980 | Dick | 280/258 |
| 4,272,094 | 6/1981 | Patrin | 280/217 |

FOREIGN PATENT DOCUMENTS 2521410  11/1976  Fed. Rep. of Germany ...... 280/217

Primary Examiner—John A. Pekar
Assistant Examiner—D. Lynn Fugate
Attorney, Agent, or Firm—Sim & McBurney

[57] ABSTRACT

There is provided a vehicle which includes a frame, a steerable wheel mounted on the frame and at least one further wheel mounted for free rotation on the frame. A flywheel is mounted for rotation adjacent one of the wheels. The vehicle includes means for imparting rotation to the flywheel, and a clutch plate rotatably and coaxially mounted adjacent the same wheel to which the flywheel is adjacent. Speed-reduction means allows rotation of the flywheel to rotate the clutch plate at a faster rate than the flywheel, and a frictionless clutch is provided between the clutch plate and the adjacent wheel.

10 Claims, 5 Drawing Figures

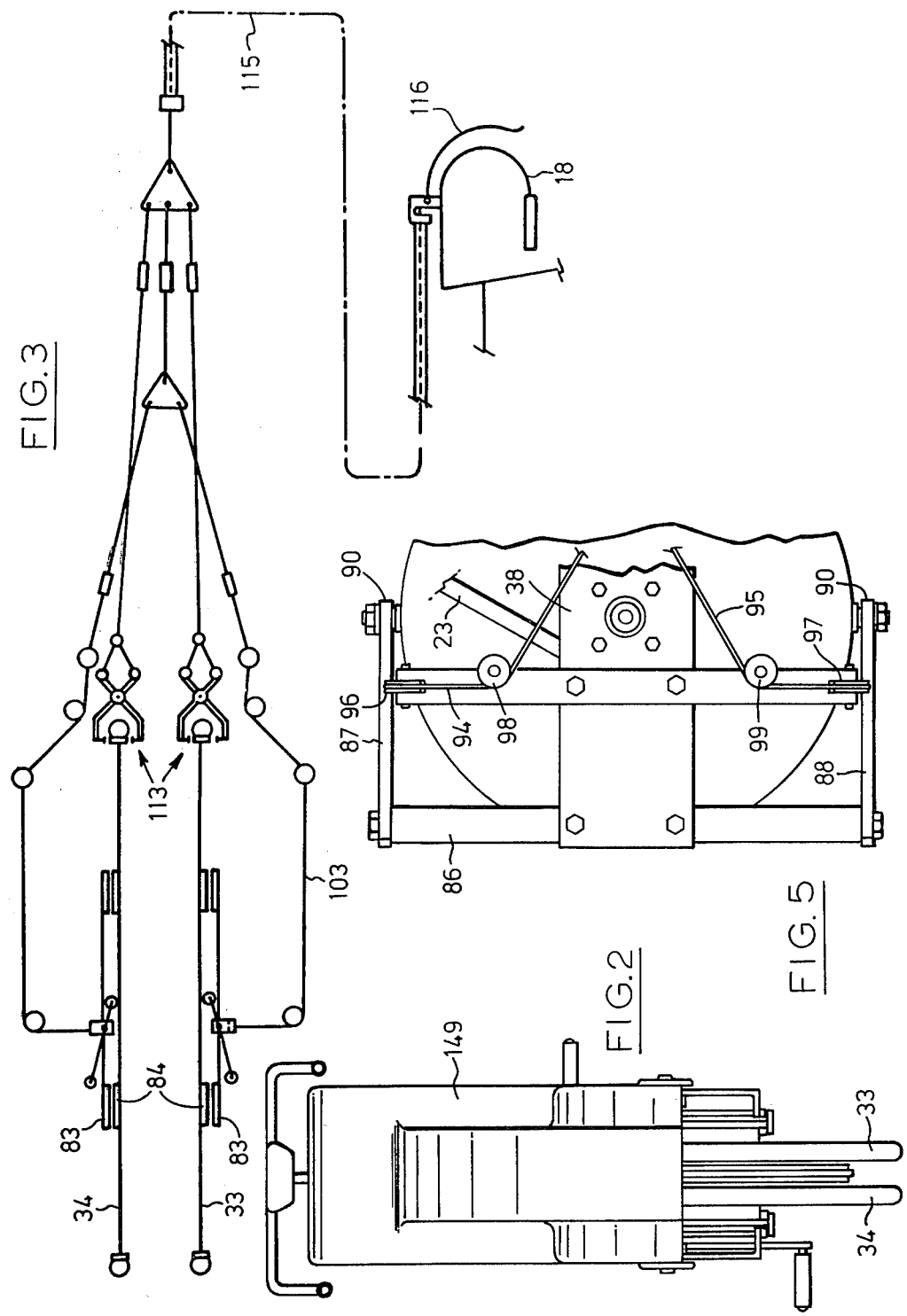

VEHICLE STRUCTURE

The invention relates generally to vehicle constructions, and has to do in particular with a bicycle construction which overcomes certain disadvantages of prior art constructions, and which especially allows the operator to provide more power efficiently to the driving portion of the bicycle.

BACKGROUND OF THIS INVENTION

The currently popular bicycle constructions include what is known as a "coaster" bicycle, and a number of multiple-speed bicycles. The "coaster" bicycle is one in which a chain entrained around a sprocket driven by rotary pedals in turn rotates a smaller sprocket at the hub of the rear wheel, the smaller sprocket being adapted to drive the rear wheel when it rotates in the forwardly direction, and to brake the rear wheel when it is turned in the opposite direction. Several decades ago most popular bicycles were of the "coaster" type. Since that time, developments have included the three-speed bicycle, and then the five and ten-speed bicycles. Braking on all multiple speed bicycles is carried out by hand brakes usually mounted on the handle bars.

All of the foregoing bicycle constructions suffer from certain disadvantages. The first disadvantage relates to the fact that the pedals of the bicycle are mounted for rotary motion. Because of this pedal arrangement force cannot be efficiently applied to the pedals when they are in top or bottom dead center position. Force applied when a pedal is near the top of its swing gives only a small component in the rotary sense, the rest being axially directed along the arms supporting the pedal. Another shortcoming relates to the necessarily short arm on which pedals are normally mounted. The typical arm length is of the order of $6\frac{1}{2}$ to 7 inches. It is well known that a greater moment (torque) can be generated by using a given amount of force over a longer moment arm.

Another shortcoming of the conventional bicycle structures relates to the rather cumbersome way in which the gearing adjusts the pedal rotation for different speeds of the bicycle. All multiple-speed bicycles typically have one or more "gears" in which a given speed of pedal rotation will produce a relatively slow speed in the vehicle, though one in which greater power is available for forward motion. But bicycles also include one or more "high" gears, in which the same speed of pedal rotation produces a considerably faster forward motion in the bicycle. However, these multiple gearing systems, even that known as the ten speed system, are limited in terms of the maximum differential of the lowest gear and the highest gear. Furthermore, the changing of the gears itself is a tricky manoeuvre which normally wastes a certain period of time while the chain switches from one sprocket to another. During this switching manoeuvre forward driving force cannot be efficiently applied to the pedals. In many three-speed bicycles, the operator must actually cease pedalling to allow the gears to switch. The loss of this gear-switching time in terms of applying propulsive force to the pedals can make the difference between winning and losing a race.

In addition of the conventional structures described above which are available in the market place, certain other mechanisms are exemplified in prior patents. Some of these prior patents involve flywheels or similar energy-storing rotational members, but in many cases the mechanisms are hopelessly complicated and are such that much of the energy exerted by the operator will be lost in friction. One such prior art mechanism is illustrated in U.S. Pat. No. 1,784,419, issued Dec. 9, 1930 under A. Devito.

Another prior art structure incorporating a flywheel is that illustrated in U.S. Pat. No. 2,141,233, issued Dec. 27, 1938 to C. S. Alexander.

Yet another prior structure involving flywheels in exemplified in U.S. Pat. No. 4,037,854 issued July 26, 1977 to Eugene Large.

Mention has been made of these particular prior art patents for the purpose of explaining that the provision of a flywheel on a bicycle can be a mixed blessing, if the structure of the flywheel and the supporting elements are not correctly chosen. While on the one hand the presence of the flywheel allows the operator to store energy prior to "take off", many flywheel structures are necessarily quite heavy and certainly add extra weight to the bicycle which otherwise would not be present. It is well known, for example, that the most efficient storage of energy in a flywheel takes place when the flywheel has a relatively heavy rim, i.e. is one in which most of the weight is concentrated as far away from the axis of the flywheel as possible.

A particular disadvantage of at least some of the prior art patents listed above relates to the difficulty in properly shielding the flywheel from contact by the operator. Naturally, with the flywheel spinning at excessive rates of speed, it is quite important to keep skin or clothing free from contact with the flywheel. In the case of U.S. Pat. No. 4,037,854, several openly accessible wheels in addition to the riding wheels of the bicycle are provided, immediately adjacent to where operator is moving his legs. A similar situation arises in U.S. Pat. No. 2,141,233.

GENERAL DESCRIPTION OF THIS INVENTION

In view of the shortcomings of the existing or conventional bicycle structures, and the disadvantages of the prior art as exemplified in the patents listed above, it is an aspect of this invention to provide a new bicycle construction which, although utilizing the flywheel principle, does so in an entirely safe manner at a low center of gravity and without adding excessive weight to the overall vehicle. The aim of a further aspect of this invention is to utilize a pedalling principle in which the much longer pedal arms are merely rocked back and forth over a relatively small angle, thereby permitting the operator to direct downward force upon the pedals in the most efficient manner possible, due to the absence of top and bottom dead center positions.

The aim of a further aspect of this invention is to provide a continuous variable clutching mechanism which allows power provided through the pedalling structure to be delivered to the driving wheel or wheels of the bicycle at incremental torques, without any gear changing, and without any heat-dissipating frictional contact. In this manner, a complete range of speeds from very slow to very fast can be accommodated without passing through any gear change, without requiring any pause as is the case with present-day three-speed bicycles, and without any needless dissipation of the energy provided into the system by the operator.

Accordingly in a broad aspect, this invention provides a vehicle which includes a frame with a steerable wheel mounted on the frame and two further wheels mounted coaxially for free rotation on the frame at relatively close spacing. A flywheel is mounted for rotation between the two further wheels and coaxial therewith, whereby the further wheels shield the flywheel. Two pedals are provided for imparting rotation to the flywheel, and two clutch plates are rotatably mounted coaxially adjacent the two further wheels. A speed-change arrangement is provided for allowing rotation of the flywheel to rotate the clutch plates at a faster rate than the flywheel, and a frictionless clutch, typically magnetic, is provided between each clutch plate and each of the further wheels.

In a preferred embodiment, the frictionless clutch involves magnetic means on both the clutch plate and the associated wheel.

GENERAL DESCRIPTION OF THE DRAWINGS

One embodiment of this invention is illustrated in the accompanying drawings in which like numerals denote like parts throughout the several views, and in which:

FIG. 2 is a rear view of the bicycle of FIG. 1;

FIG. 3 is a schematic view of the brake and clutch-control mechanism for the bicycle of FIG. 1;

FIG. 5 is an elevational view of the clutch-controlling portion of the bicycle of FIG. 1.

DETAILED DESCRIPTION OF THE DRAWINGS

Figure 1:
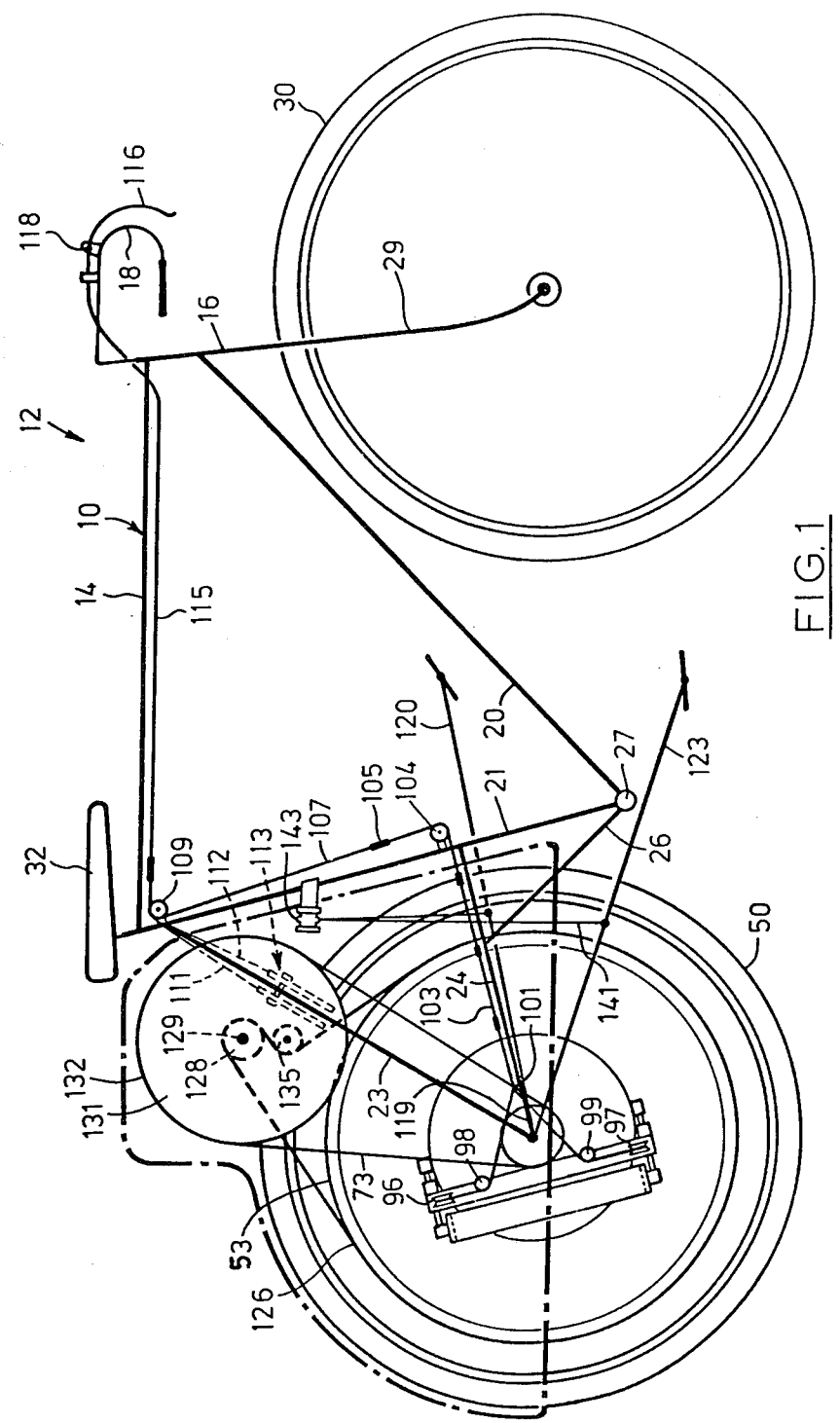
FIG. 1 is a somewhat schematic elevational view of a bicycle exemplifying this invention.

Attention is first directed to FIG. 1, which shows in line drawing the frame 10 of a bicycle 12, the frame 10 including an upper horizontal member 14, a forward steering column 16, handle bars 18, a forward oblique member 20, a rearward oblique member 21, support members 23 and 24 for the rear axle, and brace member 26. The members 20, 21 and 26 come together at junction 27 which in conventional bicycles represents the hub of the pedal arms, but which in the present structure is merely a location of connection between the converging members.

As is conventional for bicycles, the steering column 16 terminates in a front wheel fork 29 which supports a steerable front wheel 30. The rearward oblique member 21 of the frame 10 rises above the horizontal member 14 and supports the bicycle seat 32 in a conventional manner.

The parts in the portion thus far described may be considered conventional, as they can be found in virtually all currently available bicycles.

Figure 4:
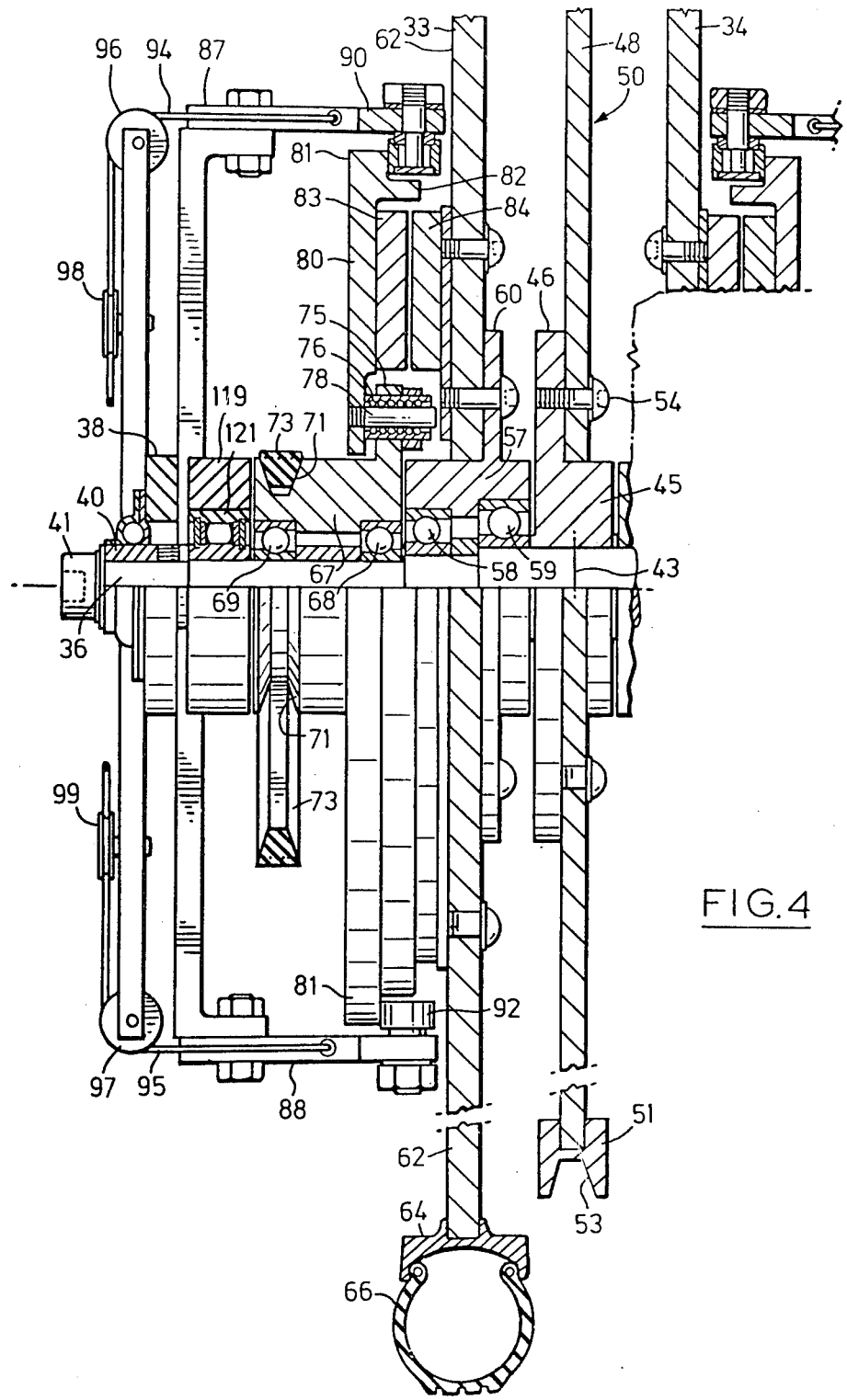
FIG. 4 is a partly sectioned and partly elevational view through the rear axial of the bicycle of FIG. 1.

Attention is now directed to FIG. 2, which is a view of the FIG. 1 bicycle from the rear. It will be seen that whereas the conventional bicycle has only a single rear wheel, the bicycle shown in these Figures has two rear wheels 33 and 34. The rear wheels are mounted for free rotation and in spaced-apart relation with respect to the frame 10 of the bicycle and attention is directed to FIG. 4 for a description of the precise mounting of the wheels 33 and 34. In FIG. 4, the view is taken from the opposite direction to that of FIG. 2, so that wheel 33 appears on the left on FIG. 4, wheel 34 appearing on the right. In FIG. 4 is shown an axle which is freely rotatably mounted with respect to the lower rear member 38. Member 38 is fixed with respect to the frame members 23 and 24 described previously with respect to FIG. 1.

It will be understood that the frame members 23 and 24 are duplicated on the other side, and that suitable bracing members are provided to allow the two pairs of frame members 23 and 24 to encompass the two rear wheels 33 and 34 together with the remaining mechanism shortly to be described. In FIG. 4 the numeral 40 identifies the standard frame-to-axle bearings; in other words the axle 36 is mounted with respect to the frame member 38. The axle has a protective cap 41 of conventional type. As can be seen in FIG. 4, the axle 36 includes a number of sections which, proceeding from the outside inwardly are of gradually increasing diameter for assembly purposes. The axle midpoint of the axle is identified by the line 43. Fixedly mounted to the axle and centered with respect to the mid line 43 is a flywheel hub 45. Bolted to a radially outstanding flange 46 integral with the flywheel hub 8 is the web 48 of a flywheel 50, which has at its outer periphery a rim 51 defining a V-groove 53 adapted to receive a V-belt (not shown in FIG. 4). The web 48 is fastened to the flange 46 by virtue of a plurality of bolts 54. While the web 48 may be made of a number of materials, and could indeed be constructed of spokes similar to conventional bicycle wheels, it is preferred that a simple sheet or plate of plastic material such as reinforced fiber glass be utilized as the web 48.

Flanking the flywheel 50 on either side are the two driving wheels 33 and 34. These numerals have been used to refer to the entirety of each wheel, which can been seen FIG. 4 to include a wheel hub 57 mounted for free rotation with respect to the axle 36 through ball bearings 58 and 59. The wheel hub 57 has an upstanding flange 60 to which is bolted the web 62 of the wheel 33.

It will be understood that all items in FIG. 4 leftwardly of the flywheel hub 45 are symmetrically reproduced to the right of the flywheel hub 45, and therefore it is not deemed necessary to describe each item on either side of the hub 45. In effect, the assembly shown in FIG. 4 is a mirror image about the line 43, ignoring the asymmetry of the hub 45 itself.

The next hub outwardly from the wheel hub 57 is a clutch hub 67 which is mounted for free rotation about the axle 36 through ball bearings 68 and 69. The clutch 67 is axially elongated and defines in its outward portion a V-groove 71 adapted to receive a V-belt 73. At its inside end the clutch 67 includes an upstanding flange 75 in which are mounted a plurality of ball bushings 76 defining an internal passageway parallel to the axle 36 along which a pin 78 can slide axially. The pin 78 is fixedly secured to a clutch plate 80 of annular form, the clutch plate 80 including an upstanding rim 81 and an inwardly projecting cylindrical portion 82 for protective purposes. Mounted to the inside surface of the clutch plate 80 are a plurality of magnets 83, while at adjacent positions on the web 62 of the wheel 33 are a second plurality of magnets 84. When the clutch plate 80 is in the position shown in FIG. 4, the magnets 83 and 84 are in close proximity, and able to transmit torque between the clutch plate 80 and the web 62 of the wheel 33. However, when the clutch plate 80 moves axially away from the wheel 33, the distance between the magnets 83 and 84 increases, and the torque-transmitting capability of the magnetic clutch arrangement which they constitute decreases.

Referring now to FIGS. 4 and 5, the frame member 38 is seen in FIG. 5 to be a horizontally elongated member which supports at its leftward or rearward end a vertical strut 86, at opposite ends of which are pivotally mounted levers 87 and 88 which are adapted to swing in approximately horizontal planes. The free end 90 of each lever 87 and 88 has secured thereto a cam follower wheel 92 which is adapted to engage the rim 81 of the clutch plate 80. It will be appreciated that, as the levers 87 and 88 swing in such a way that their free ends 90 move away from the wheel 33, the clutch plate 80 will be forced axially leftwardly in FIG. 4, thus separating the plurality of magnets 83 from the plurality of magnets 84, and thus gradually decreasing the torque which can be transmitted from the clutch plate 80 to the wheel 33.

In order to move the levers 87 and 88 in the manner just indicated there are provided two cables 94 and 95, each having a free end attached to one of the levers 87 and 88. The cables 94 and 95 are entrained around freely turning pulleys 96 and 97 respectively, thence around freely turning pulleys 98 and 99 respectively, from which the two cables 94 and 95 converge together to the location 101 (see FIG. 1) and are attached to the single cable 103. The latter is in turn entrained around a freely turning pulley 104 which is mounted with respect to the rearward oblique frame member 21. The cable 103 converges to join its corresponding cable on the other side of the rear wheel assembly at a location 105, the two cables becoming a single cable 107 which is in turn entrained around a pulley 109 following which it converges to join up with two cables 111 and 112 from the rear wheel brakes 113 (see FIG. 1) thus ending as a single cable 115. As seen in FIGS. 1 and 3, the cable 115 is in the form of a Bowden wire which allows pivotal movement of a lever 116 about a pivot location 118 fixed with respect to the handle bars 18 to cause the wire 115 to be pulled rightwardly along the horizontal frame member 14. Such motion of the cable 115 simultaneously applies the brake mechanisms 113 to the two rear wheels 33 and 34, and disengages the magnetic clutch by swinging the levers 87 and 88 in the manner previously described, thus pushing the clutch plate 80 away from its corresponding rear wheel 33. Of course, the same separation between clutch plate and wheel takes place with respect to the other wheel 34, although this has not been and need not be described in detail due to the symmetry involved.

Returning finally to FIG. 4, the numeral 119 identifies the pivoted end of one pedal arm 120, the end 119 of the pedal arm being fixedly secured to a one way drive means 121 which is such as to allow reciprocation of the pedal arm 120 to rotate the axle 36, and thus to rotate the flywheel 50. One such suitable conventional device is known as a roller ramp clutch. As it is a conventional off-the-shelf item, the device 121 does not require further description in this disclosure. A second pedal arm 123 is provided on the other end of the axle 36, likewise equipped with a one-way driving device. As can be seen particularly in FIG. 1, the length of the pedal arms 120 and 123 is considerably greater than the typical arm length of a rotary pedal mechanism bicycle. This allows virtually all of the force applied by the operator to be efficiently transmitted to the working mechanism, without requiring that force be applied with pedals in a top dead center or bottom dead center position. The considerably greater length of the pedal arms 120 and 123 also ensures that the torque available at the axle 36 will be maximized.

Entrained around the flywheel 50 and riding in the V-groove 53 is a V-belt 126, which is also entrained around a pulley wheel 128 which is mounted for rotation about an axis 129 fixed with respect to and supported by the bicycle frame 10 by means not shown. It will be noted that the axis 129 is located beyond the rim of the rear wheels 33 and 34. The pulley wheel 128 is fixed with respect to two further pulley wheels 131 and 132 located on either side of the pulley wheel 128 (the pulley wheels 131 and 132, being aligned in the view of FIG. 1, appear as a single circle). The two pulley wheels 131 and 132 are in alignment with the V-groove 71 of the clutch hub 67 and with the V-groove in the opposite clutch hub respectively. At their outer peripheries, the pulley wheels 131 and 132 support a rim very similar to the rim 51 on the flywheel 50, the rims of the pulley wheels 131 and 132 also having V-grooves adapted to be engaged by V-belts. The nearer pulley wheel 131 in FIG. 1 has entrained around it the V-belt 73 seen in FIG. 4, which also engages the clutch hub 67. An identical V-belt (not shown in the Figures) engages the further pulley wheel 132 as pictured in FIG. 1.

For the purpose of avoiding slack in the V-belt 126, a tightener wheel 135 can be provided, mounted to be horizontally moveable with respect to the frame 10.

It can thus be seen that a single rotation of the flywheel 50 will cause a large number of rotations of the smaller pulley wheel 128 and of the pulley wheels 131 and 132. These latter will cause an even higher rpm in the clutch hub 57 and its corresponding clutch hub on the other side. Hence, even relatively small rotation of the flywheel 50 will cause very rapid rotation of the clutch hub 67, the corresponding clutch hub on the other side, and the corresponding clutch plates. Because of the speed change system represented by the flywheel 50, the pulley wheel 128, the pulley wheels 131 and 132 and the clutch hubs, it is possible to ensure that, for all practical purposes, any desired maximum speed for the bicycle can be obtained without having the revolutionary rate of the wheels 33 and 34 exceed the rpm of the clutch plates. The clutch plates will always be "pulling" the wheels in the forward direction, without the operator being required to pedal excessively quickly on the pedal arms 120 and 123.

To ensure that the pedal arms 120 and 123 operate in tandem i.e. that one rises as the other falls, a chain 141 can be attached so that its ends are connected to the pedal arms 120 and 123 respectively, and entrained over a freely-turning sprocket 143 supported rearwardly of the rear oblique member 21 of the bicycle frame 10.

If desired, the entire rear assembly can be covered by a rear wheel guard 149, which is supported from the frame 10 of the bicycle 12.

As can be seen at the bottom in FIG. 4, the web 62 has at its perphery rim 64 supporting the usual air-filled bicycle tire 66.

To coast, one holds the clutch-brake lever 116 in a half-way position.

It will therefore be appreciated that there has been disclosed a novel and advantageous bicycle structure in which no cumbersome gear-changing mechanisms are utilized but which is capable of transmitting forward thrust to the vehicle at all speeds from 0 up to a very high maximum speed, due to the fact that the clutch plates are made to rotate so rapidly. In a preferred embodiment, said clutch plates, which also function as smaller-diameter flywheels with heavier magnetic peripheries, rotate in series with the main flywheel but at a much higher speed. It will further be appreciated that the power being used to propel the vehicle forwardly is transmitted to the rear wheel assembly with the maximum efficiency due to the fact that the standard pedal arm arrangement has been avoided, thus also avoiding the wastage of energy when pressing against pedals that are in the top or bottom dead center position.

While a specific embodiment of this invention has been described and illustrated in this disclosure, it will be apparent to those skilled in the art that changes and modifications may be made therein without departing from the spirit and scope of the invention as set forth in the claims appended hereto.

I claim:

1. A vehicle comprising:
    a frame,
    a steerable wheel mounted on said frame,
    two coaxial rear wheels mounted for free rotation in spaced-apart relation on said frame,
    a flywheel mounted for rotation between said coaxial rear wheels,
    means for imparting rotation to said flywheel,
    a clutch plate rotatably mounted outwardly adjacent at least one rear wheel and coaxial therewith,
    speed-change means for allowing rotation of the flywheel to rotate the clutch plate at a faster rate than said flywheel, said speed-change means including a freely turning first pulley wheel mounted for rotation about an axis beyond the rim of the rear wheels, the first pulley wheel being fixed with respect to a second pulley wheel of smaller diameter which turns therewith, first endless drive means entrained around said flywheel and said second pulley wheel, and second endless drive means entrained around said first pulley wheel and a small-diameter portion of a clutch plate assembly of which said clutch plate is a part,
    and frictionless clutch means between the clutch plate and said at least one rear wheel.

2. The vehicle claimed in claim 1, in which said means for imparting rotation to said flywheel includes pedals mounted for reciprocating movement about the common axis of the rear wheels, and one-way drive means allowing reciprocation of the pedals to rotate said flywheel.

3. The vehicle claimed in claim 1, in which said frictionless clutch means is a magnetic clutch.

4. The vehicle claimed in claim 1, in which said frictionless clutch means includes first magnetic means on said clutch plate and second magnetic means on said at least one rear wheel, and selectively manually operable means for varying the distance between said first and second magnetic means.

5. The vehicle claimed in claim 1, in which there are two clutch plates outwardly adjacent the two rear wheels respectively, said speed change means rotating both clutch plates in tandem.

6. A vehicle comprising:
    a frame,
    a steerable front wheel mounted on said frame,
    two coaxial rear wheels mounted for free rotation in spaced-apart relation on said frame,
    a flywheel mounted for rotation between said coaxial rear wheels,
    pedal means for imparting rotation to said flywheel, the pedal means including two pedals mounted to reciprocate on either side of said frame above the common axis of the rear wheels, each pedal operating a one-way drive device allowing downward force on each pedal to rotate said flywheel,
    two clutch plates rotatably mounted outwardly adjacent the two rear wheels and coaxial therewith,
    speed-change means for allowing rotation of the flywheel to rotate the clutch plates at a faster rate than said flywheel, said speed-change means including first and second freely turning pulley wheels of identical construction mounted for rotation about an axis located beyond the rim of the rear wheels, the said two pulley wheels being fixed with respect to a third pulley wheel of smaller diameter which turns therewith and which is located between them, first endless drive means entrained around said first-mentioned flywheel and said third pulley wheel, second endless drive means entrained around the first pulley wheel and one of the clutch plates, and third endless drive means entrained around the second pulley wheel and the other clutch plate,
    and frictionless clutch means between each clutch plate and its respective rear wheel.

7. The vehicle claimed in claim 6, in which said frictionless clutch means includes first magnetic means on each clutch plate and second magnetic means on the associated rear wheel, and selectively manually operatable means for varying the distance between the first magnetic means on each clutch plate and the second magnetic means on the associated rear wheel.

8. The vehicle claimed in claim 7, in which said selectively manually operable means includes, on each plate, a radially outwardly projecting rim, a lever on either side of the frame mounted for pivotable rotation about one of its ends such that the lever moves substantially in a plane which is tangent to the clutch plate, the lever carrying on its free end a camming wheel adapted to ride against said rim of the clutch plate, and cable means for positively rotating the lever such that the camming wheel presses outwardly against the rim of the respective clutch plate, each clutch plate being slideable axially to permit it to move toward and away from its respective rear wheel, but being magnetically-biased in the direction toward said rear wheel.

9. A vehicle comprising:
    a frame,
    a steerable wheel mounted on said frame, and two further wheels mounted coaxially for free rotation on said frame at relatively close spacing,
    a flywheel mounted for rotation between said two further wheels and coaxial therewith, whereby the further wheels shield the flywheel,
    pedal means for imparting rotation to said flywheel,
    two clutch plates rotatably mounted coaxially adjacent said two further wheels,
    speed-change means for allowing rotation of the flywheel to rotate the clutch plates at a faster rate than said flywheel,
    and frictionless clutch means between each clutch plate and each said further wheel.

10. The vehicle claimed in claim 9, in which the steerable wheel is a front wheel, and the further wheels are rear wheels.

* * * * *